(12) United States Patent
Chevalier et al.

(10) Patent No.: US 7,487,000 B1
(45) Date of Patent: Feb. 3, 2009

(54) NAVIGATION SCREEN SYSTEM AND METHOD FOR REMOTE CONTROL

(75) Inventors: Christopher W. Chevalier, Tempe, AZ (US); Edward J. Brachocki, Scottsdale, AZ (US); William Anton M. McHatton, Anthem, AZ (US); Douglas Patton, Irvine, CA (US); Mehdi Haghdad, La Canada, CA (US); Dana Bertles, Laguna Beach, CA (US); Dean Mondragon, Cudahy, CA (US); Robert Gibb, Mission Viejo, CA (US)

(73) Assignee: TCL GoVideo Ltd., New Territory (HK)

( * ) Notice: Subject to any disclaimer, the term of this patent is extended or adjusted under 35 U.S.C. 154(b) by 199 days.

(21) Appl. No.: 11/324,656

(22) Filed: Jan. 3, 2006
(Under 37 CFR 1.47)

Related U.S. Application Data

(60) Provisional application No. 60/641,167, filed on Jan. 4, 2005.

(51) Int. Cl.
| | |
|---|---|
| *G05B 15/00* | (2006.01) |
| *G06F 3/00* | (2006.01) |
| *G06F 3/048* | (2006.01) |
| *G06F 13/00* | (2006.01) |
| *G06F 3/02* | (2006.01) |
| *H04N 5/445* | (2006.01) |
| *H04N 9/74* | (2006.01) |
| *H04N 5/44* | (2006.01) |
| *G09G 5/00* | (2006.01) |

(52) U.S. Cl. .................. 700/83; 715/716; 715/835; 715/840; 725/40; 725/44; 725/48; 725/56; 725/61; 345/156; 345/169; 348/564; 348/588; 348/734

(58) Field of Classification Search ................ 700/83; 715/700, 716, 717, 810, 835, 840, 764, 808; 725/37–41, 44, 48, 56, 61, 109, 111, 118, 725/131, 135, 139; 345/158, 156, 169, 440; 348/563, 564, 569, 571, 584, 578, 588, 589, 348/601, 734, E5.103–E5.105, E7.054, E7.069, 348/E7.07, E7.071; 340/426.13, 825.49, 340/825.69, 825.72; 341/176; 386/108
See application file for complete search history.

(56) References Cited

U.S. PATENT DOCUMENTS

| | | | | |
|---|---|---|---|---|
| 5,548,345 | A | * | 8/1996 | Brian et al. .................... 725/27 |
| 5,760,842 | A | * | 6/1998 | Song ........................... 348/564 |
| 5,774,063 | A | | 6/1998 | Berry et al. |
| 5,956,025 | A | | 9/1999 | Goulden et al. |
| 5,990,890 | A | * | 11/1999 | Etheredge .................... 715/808 |

(Continued)

FOREIGN PATENT DOCUMENTS

WO   WO 2004028152   4/2004

(Continued)

*Primary Examiner*—Crystal J Barnes Bullock
(74) *Attorney, Agent, or Firm*—Burns & Levinson LLP; Harvey Kaye; Jerry Cohen

(57) ABSTRACT

A system and method to provide navigation screens during remote control of devices. A matrix is used to relate button depression and navigation screen to a particular activity. Generic buttons on the remote control can be dynamically defined according to the content of the navigation screens and the configuration of the devices under the control of the remote control.

17 Claims, 13 Drawing Sheets

U.S. PATENT DOCUMENTS

| | | | |
|---|---|---|---|
| 6,025,869 A * | 2/2000 | Stas et al. ..................... 725/28 |
| 6,075,575 A * | 6/2000 | Schein et al. ................ 348/734 |
| 6,127,941 A | 10/2000 | Van Ryzin |
| 6,337,715 B1 * | 1/2002 | Inagaki et al. ............... 348/553 |
| 6,445,398 B1 * | 9/2002 | Gerba et al. ................. 715/721 |
| 6,563,430 B1 | 5/2003 | Kemink et al. |
| 6,817,027 B1 * | 11/2004 | Curreri ....................... 725/28 |
| 6,828,992 B1 | 12/2004 | Freeman et al. |
| 7,002,553 B2 * | 2/2006 | Shkolnikov .................. 345/169 |
| 7,030,845 B2 * | 4/2006 | Maa ............................ 345/88 |
| 7,174,518 B2 | 2/2007 | Kim |
| 7,250,978 B2 * | 7/2007 | Lee et al. .................... 348/383 |
| 2002/0089427 A1 | 7/2002 | Aratani et al. |
| 2002/0089548 A1 | 7/2002 | Marler et al. |
| 2002/0194596 A1 | 12/2002 | Srivastava |
| 2003/0071855 A1 | 4/2003 | Kim |
| 2004/0061679 A1 | 4/2004 | Tsukada |
| 2004/0070628 A1 | 4/2004 | Tommi et al. |
| 2004/0075777 A1 | 4/2004 | Lee et al. |
| 2004/0090315 A1 | 5/2004 | Mackjust et al. |
| 2004/0150546 A1 | 8/2004 | Choi et al. |
| 2004/0213557 A1 | 10/2004 | Krakirian et al. |
| 2004/0252119 A1 | 12/2004 | Hunleth et al. |
| 2004/0252120 A1 | 12/2004 | Hunleth et al. |
| 2004/0257337 A1 * | 12/2004 | Shibamiya et al. .......... 345/156 |
| 2004/0268413 A1 * | 12/2004 | Reid et al. ................... 725/131 |
| 2005/0193015 A1 * | 9/2005 | Logston et al. ........... 707/104.1 |
| 2005/0235315 A1 * | 10/2005 | Baker ........................... 725/44 |
| 2006/0022899 A1 * | 2/2006 | Johnson ......................... 345/55 |
| 2008/0184303 A1 * | 7/2008 | Schein et al. ................. 725/40 |
| 2008/0184312 A1 * | 7/2008 | Schein et al. ................. 725/52 |

FOREIGN PATENT DOCUMENTS

| | | |
|---|---|---|
| WO | WO 2004102285 | 11/2004 |
| WO | WO 2004102522 | 11/2004 |

* cited by examiner

63

Use printed Quick Reference Guide to make sure:
1. Remote batteries are Installed
2. Antenna, Basic Cable, Cable Box or Sat. Rec'r is connected to DVD+VCR
3. DVD+VCR is connected to TV
4. DVD+VCR and TV are powered on.
5. Cable box/Sat. Rec'r is powered on (if applicable)
6. TV is set to channel 3 or correct AV input.

NAVIGATION SCREEN SYSTEM AND METHOD FOR REMOTE CONTROL

CROSS REFERENCE TO RELATED APPLICATIONS

The present application claims priority to U.S. Provisional Patent Application No. 60/641,167, filed Jan. 4, 2005, entitled NAVIGATION SCREEN SYSTEM AND METHOD FOR REMOTE CONTROL, which is incorporated herein in its entirety by reference.

BACKGROUND OF THE INVENTION

Remote control devices having possible choices represented by individual buttons are being replaced by simpler devices, sometimes known as remouses, having a smaller set of generic buttons. Due to the simplicity of the remouse, comprehensive information about the interaction between the user and the user interface can be required. The user interface, usually primarily represented by screens presented to the user, can require a complicated navigation system supported by a substantial amount of computer code. What is needed is a way to reduce navigation overhead.

SUMMARY OF THE INVENTION

The problems set forth above as well as further and other problems are resolved by the present invention. The solutions and advantages of the present invention are achieved by the illustrative embodiments and methods described herein below.

The system and method of the present invention provide navigation screens for remote control of a device using a remote control device with generic buttons. In the system of the present invention, a matrix can be used to relate navigation screens and remote control buttons to particular activities, and thus the system and method facilitate remote control with a minimum of screen navigation overhead. Each cell of the matrix can provide, but is not limited to providing, a pointer to a navigation screen, a function, or another matrix having, for example, the characteristics of the navigation screen. Thus, when the user is viewing a particular navigation screen and depresses a particular button on the remote control, the system of the present invention can formulate an index into the matrix using reference numbers associated with the navigation screen and the depressed button, and a matrix cell can be retrieved. The system can process the contents of the matrix cell to provide, for example, the next navigation screen. The system can populate and access a navigation screen network which can include the navigation screens, relationships between them, and dynamic data such as, for example, device connection status. The system can populate the matrix with, for example, navigation screen data, functions, and other matrices. The matrix of the present invention is not limited to two dimensions.

The method of the present invention can include, but is not limited to, the steps of constructing a network of navigation screens, constructing a matrix in which rows and columns of the matrix represent a navigation screen from the network and a remote control button from a remote control, and associating a first action with each matrix cell. The method can further include the steps of choosing a first navigation screen from the network, sensing the depression of the remote control button, and performing the action associated with the matrix cell that is associated with the remote control button and the first navigation screen. The method can still further include the steps of choosing a further navigation screen from the network based on the action, sensing the depression of a further remote control button, performing the action associated with the matrix cell that is associated with the further remote control button and the further navigation screen, and repeating the previous three steps while the remote control is controlling a display. Possible actions that can be associated with matrix cells can include, but are not limited to, determining a preferred language, presenting instructions at the display for use of the remote control based on the context, and determining a device configuration of any device that is responding to signals from the remote control.

The system of the present invention can include, but is not limited to, a remote control, a display, a matrix constructor, an action associator, a button sensor, a cell/action selector, a dynamic data store, device connections interface, and a navigation screen selector. The system may optionally include a network constructor for building the navigation screen network and an initializer for selecting a navigation screen from the navigation screen network. These components can, in combination, provide an ordered series of navigation screens to the user to help the user navigate the remote control of a device suite.

For a better understanding of the present invention, reference is made to the accompanying drawings and detailed description. The scope of the present invention is pointed out in the appended claims.

DESCRIPTION OF THE SEVERAL VIEWS OF THE DRAWING

FIGS. 10-12A are pictorial diagrams of exemplary navigation screens that could begin the system initialization of the present invention; and FIGS. 12B-13 are pictorial diagrams of exemplary navigation screens that could begin the push button processing of the present invention.

DETAILED DESCRIPTION OF THE INVENTION

Figure 1A:
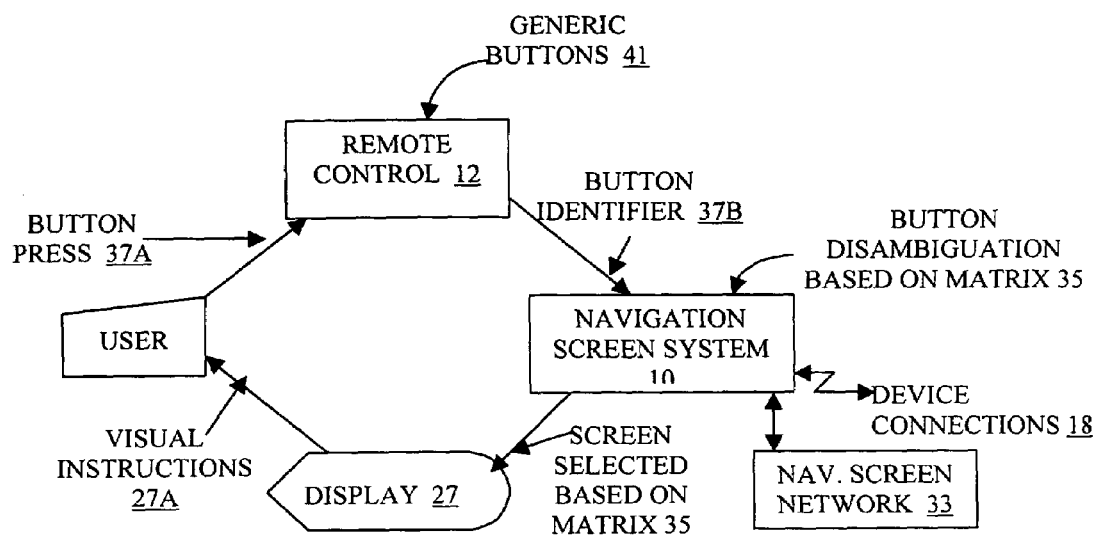
FIG. 1A is schematic block diagram of the environment of the system of the present invention.

The present invention is now described more fully hereinafter with reference to the accompanying views of the drawing, in which the illustrative embodiment of the present invention is shown.

Figure 6:
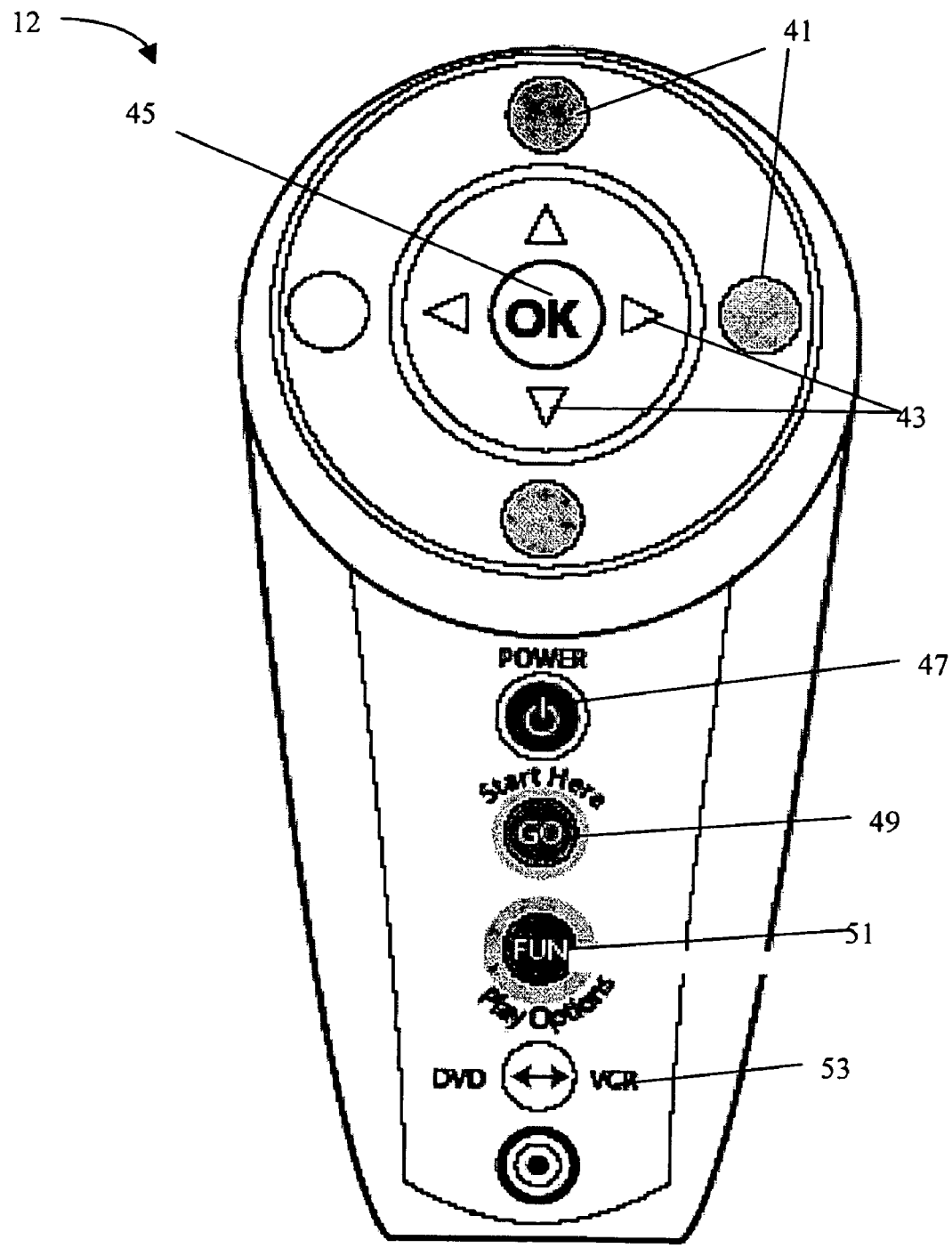
FIG. 6 is a pictorial diagram of the remote control of the present invention.

Referring now to FIG. 1A, the operational environment of navigation screen system 10 is shown. In the system of the present invention, a user can depress buttons 37 on remote control 12, which can, for example, be a remote control 12 with generic (dynamically definable) buttons 41 (FIG. 6). Remote control 12 can provide a button identifier signal 37B to navigation screen system 10, which can access navigation screen network 33 and a trail of traversed navigation screens, and which interfaces to controlled devices through device connections 18. From these data, navigation screen system 10 can generate indices into matrix 35 (FIG. 3), and can access matrix cells 36 (FIG. 3) for directions for any subsequent action, for example selecting for display the next navigation screen. Meanwhile, navigation screen system 10 can maintain dynamic data that could change as a result of changes to device connections, and can update matrix 35 and navigation screen network 33 accordingly. If navigation screen system 10 selects a navigation screen from matrix 35, navigation screen system 10 can provide the navigation screen to display 27, which can, for example, provide visual instructions 27A to the user about, for example, usage of remote control 12.

Figure 1B:
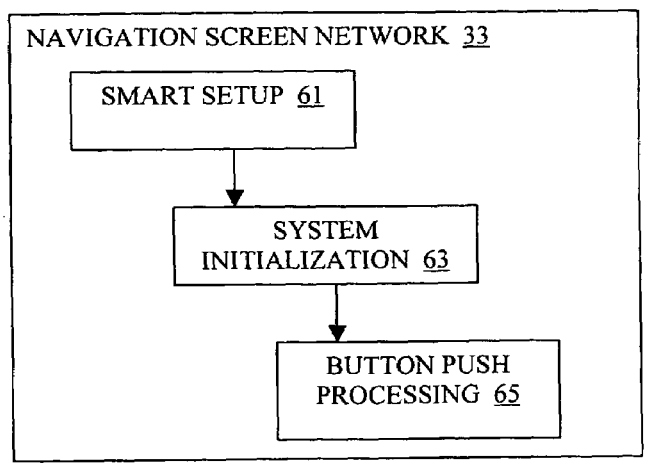
FIG. 1B is a schematic block diagram of exemplary categories of navigation screens.
Figure 2:
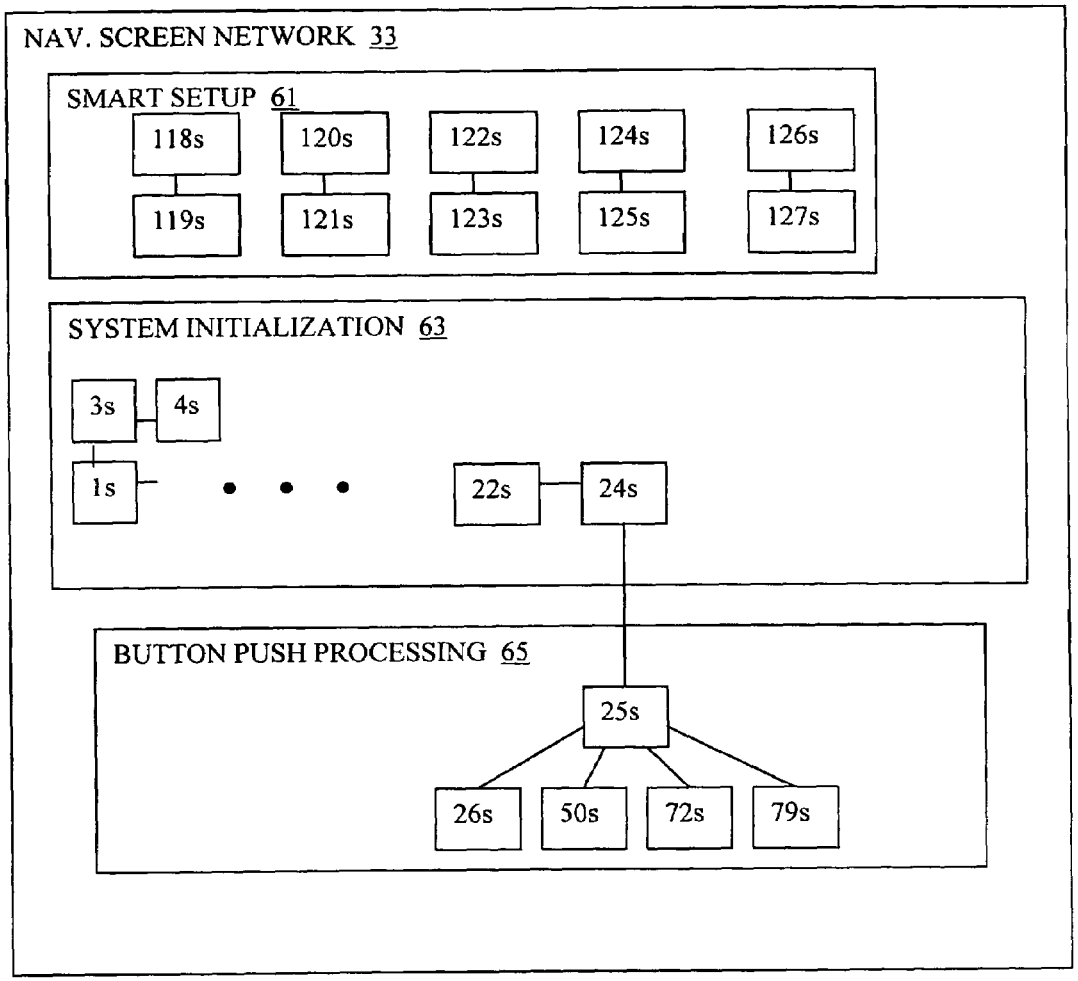
FIG. 2 is an exemplary navigation screen network showing relationships among exemplary navigation screens from FIGS. 7-13 and the attached Appendix entitled User Friendly Remote Control System (the Appendix includes numbered pages from 1 to 100, which when placed together side by side and down in numerical order, provides the entire screen system, and this is also provided in an attached compact disk containing the entire exemplary navigation screen network of the present invention)
Figure 11:
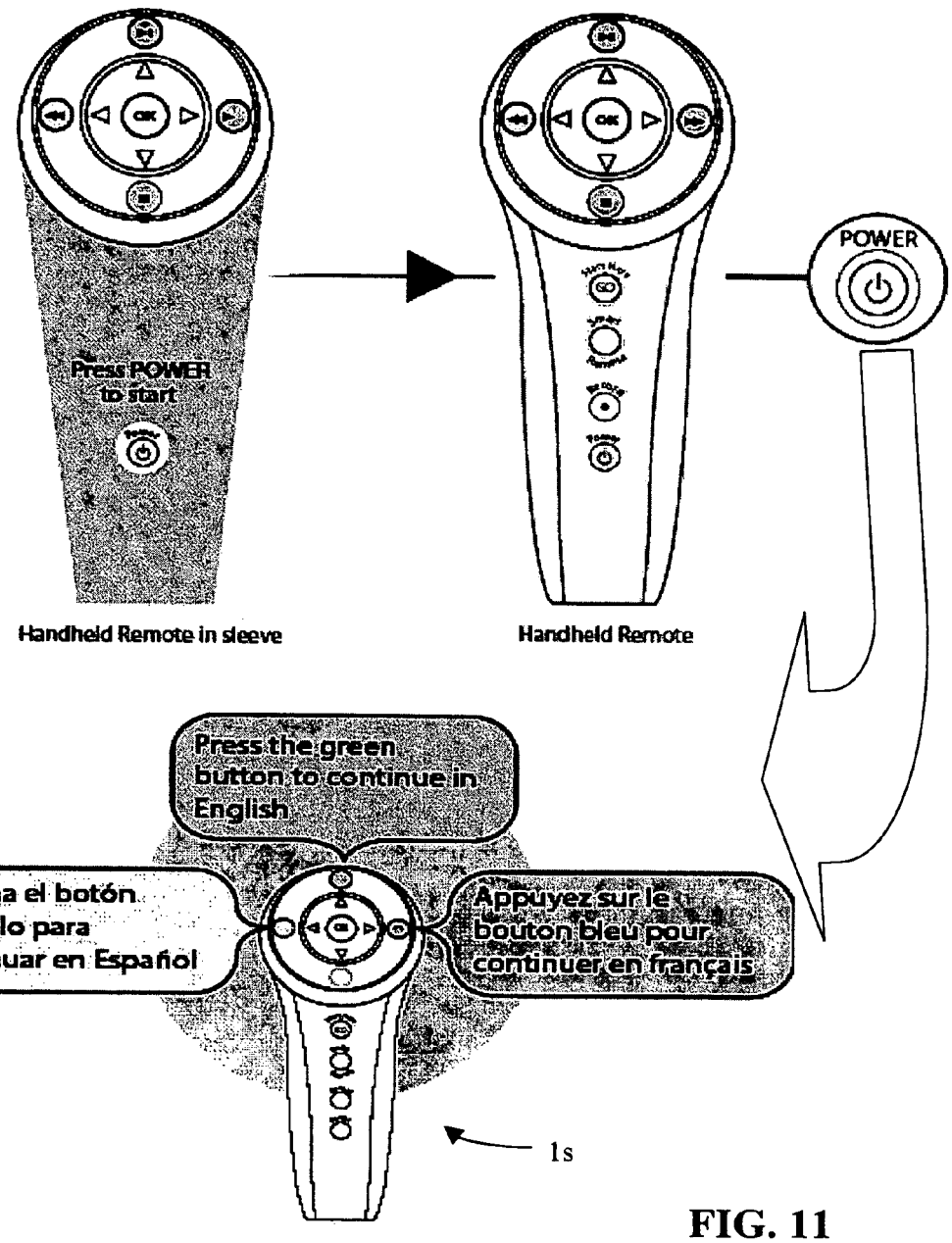
Figures 12A, 12B:
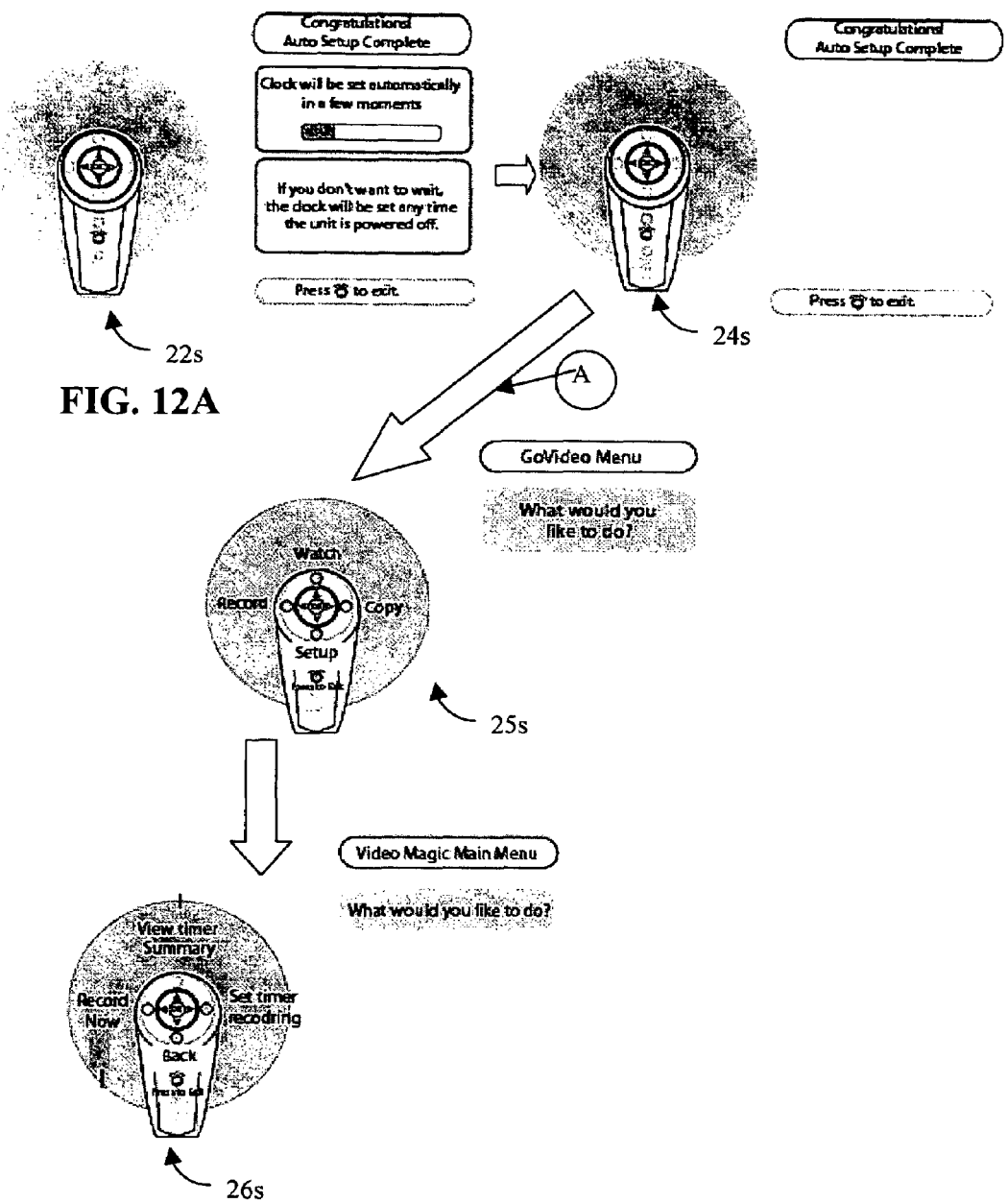
Figure 13:
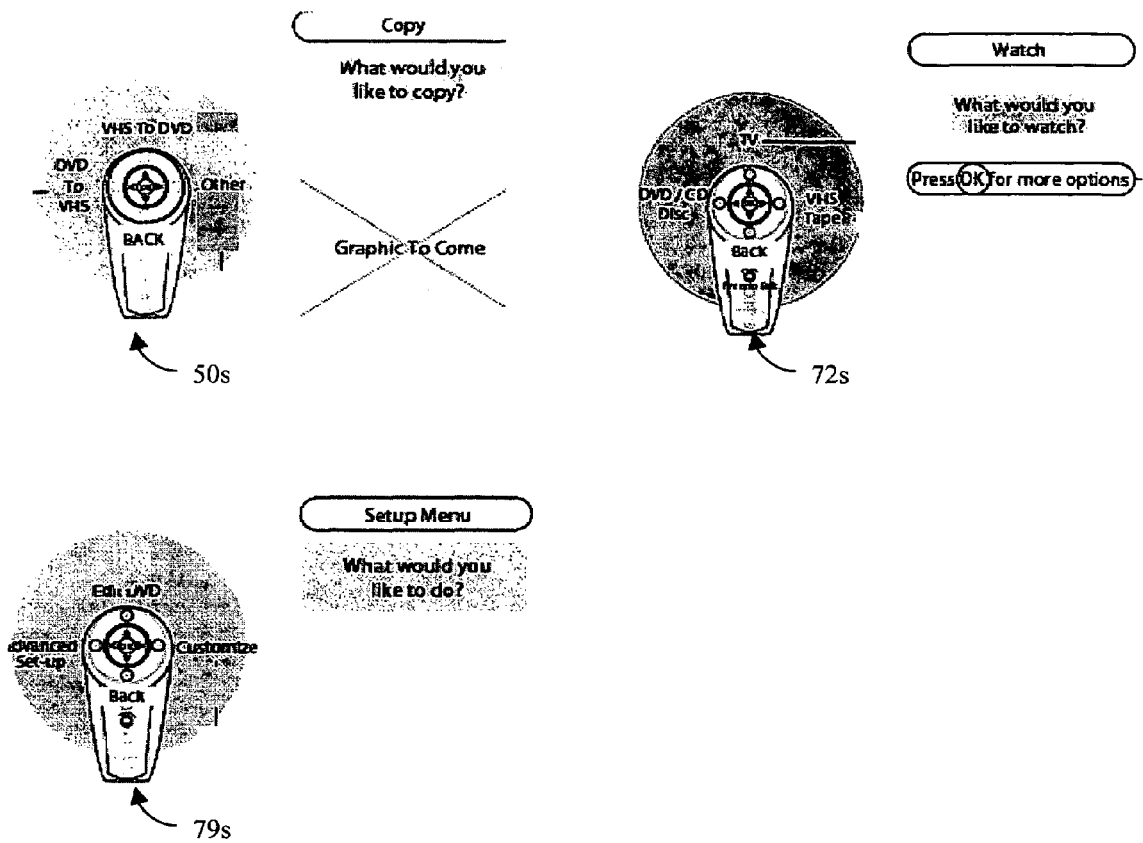

Referring now to FIGS. 1B and 2, exemplary navigation screen network 33 can be divided into, for example, three categories: smart setup 61 (exemplarily illustrated in FIGS. 7-9), system initialization 63 (exemplarily illustrated in FIGS. 10-12A), and button push processing (exemplarily illustrated in FIGS. 12B-13). Any type of navigation screen network 33 can be accessed, populated, and modified by the system of the present invention. Shown in FIG. 2 is a network diagram of the navigation screen network 33 that is presented in detail in the Appendix. For example, smart setup 61, a category of functions enabled by the present invention, can include screens 118s-127s. According to the exemplary navigation screen network 33, screen 118s is related to screen 119s, screen 120s is related to screen 121s, etc. As an example, if screen 118s were being displayed, and the user depressed a "smart" button, screen 119s could be displayed (see FIG. 7). Navigation screens for system initialization 63 and button push processing 65 are likewise shown. The exemplary navigation screen network 33 is shown herein for illustrative purposes only and does not limit the invention to the shown navigation screens and relationships among them.

Figure 3:
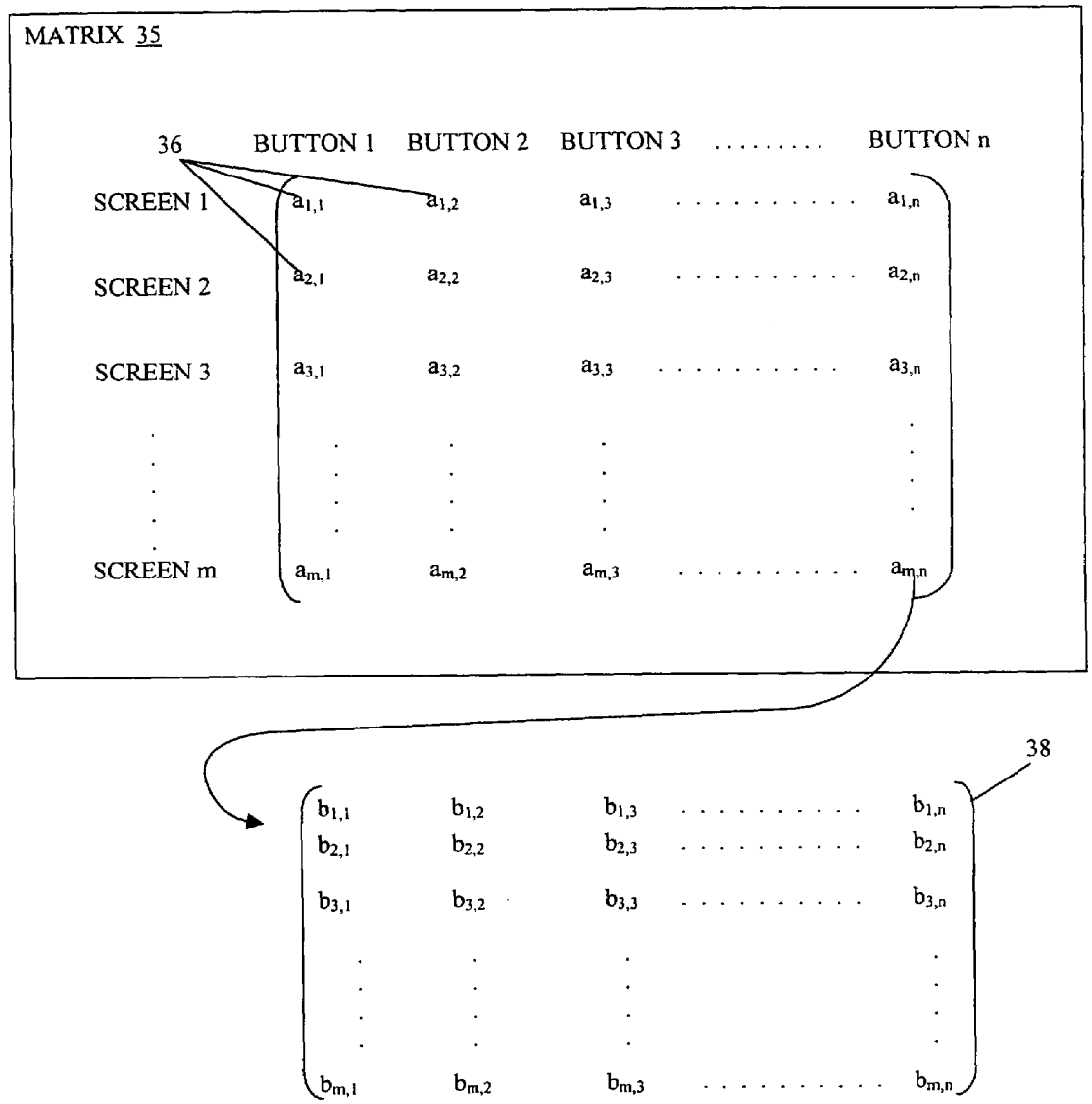
FIG. 3 is a matrix defined according to the system of the present invention.

Referring now primarily to FIG. 3, an exemplary matrix 35 is shown in which the matrix rows represent screen numbers from navigation screen network 33, and the matrix columns represent buttons on remote control 12 (FIG. 1). Matrix cells 36 can contain, for example, sub-matrix 38, a navigation screen number pointer, or any other type of action necessary to process a particular button press 37A (FIG. 1) while a particular navigation screen is being selected for display. Matrix 35 is not limited to two dimensions, and the contents of matrix cells 36 are not limited to any particular form or function.

Figure 4:
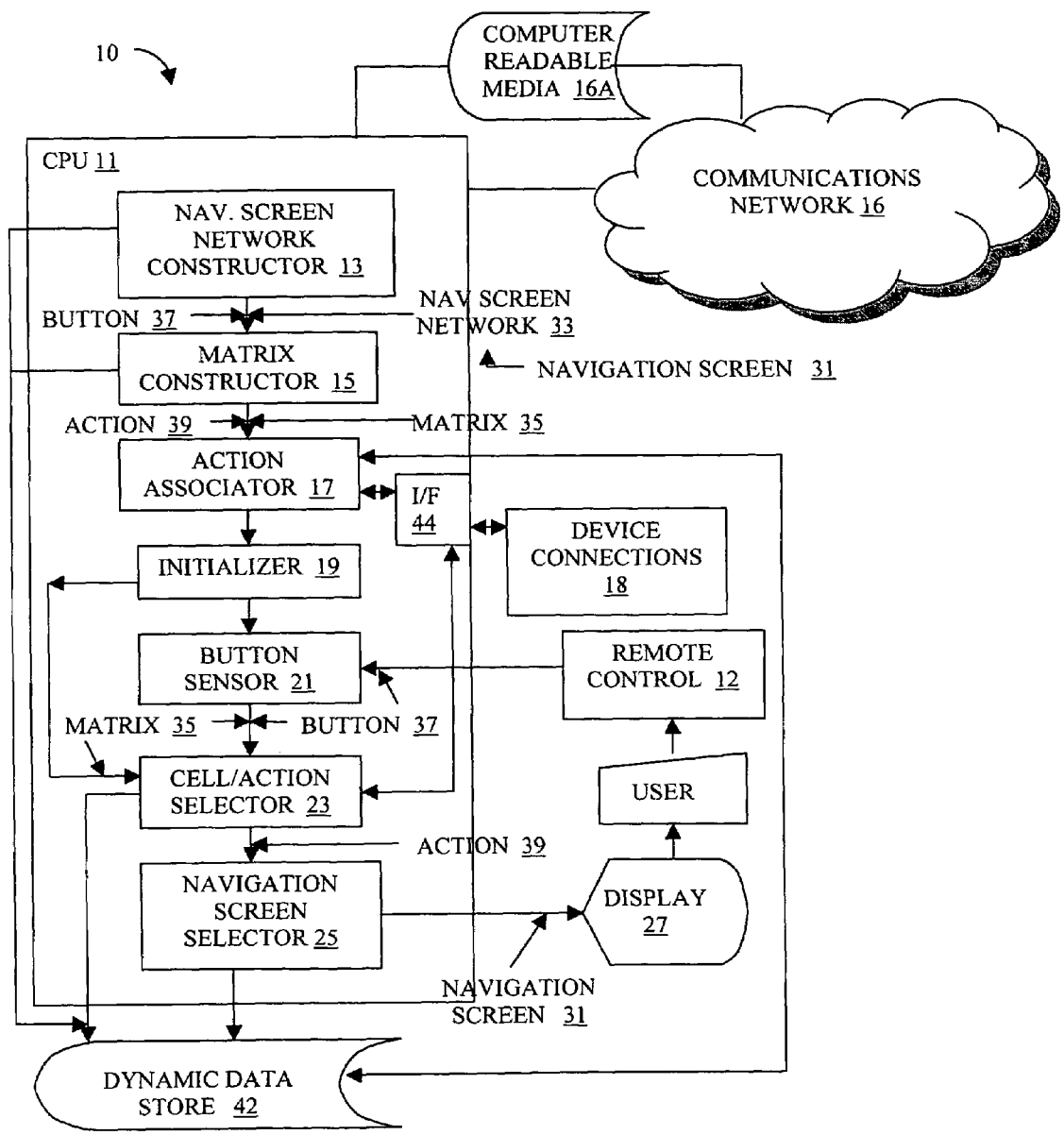
FIG. 4 is a schematic block diagram of the navigation screen system of the present invention.

Referring now to FIG. 4, navigation screen system 10 can include, but is not limited to, CPU 11, which executes computer code to enable user-friendly remote control. Navigation screen system 10 can include, but is not limited to, matrix constructor 15, action associator 17, button sensor 21, cell/action selector 23, device connections 18, dynamic data store 42, and navigation screen selector 25. Navigation screen system 10 can optionally include navigation screen network constructor 13 and initializer 19. Matrix constructor 15 can create matrix 35 which can, for example, relate at least one navigation screen 31 from navigation screen network 33 to at least one remote control button 37. Action associator 17 can associate at least one action 39 with each matrix cell 36 (FIG. 3) in matrix 35. At least one action 39 can take any form and can itself be a matrix 35 of actions 39. Action associator 17 can determine at least one action 39 to associate with each matrix cell 36. To initially populate matrix 35 and to maintain the content of both matrix 35 and navigation screen network 33, if dynamic data are part of both constructs, action associator 17 can monitor dynamically-changing data which could be associated with any devices that are controlled directly or indirectly by remote control 12, or could be modified by the user. Thus, action associator 17 can access device connections 18 through interface 44 to sense device status, among other possible actions. Information related to devices that are controlled by remote control 12 can be stored in dynamic data store 42 and can be used to modify navigation screen network 33 and matrix cells 36. Button sensor 21 can receive and process a signal from remote control 12, where the signal can represent the depression of at least one button 37. Button sensor 21 can provide that information to cell/action selector 23 which can compute, from navigation screen 31 and at least one button 37, an index into matrix 35. Cell/action selector 23 can select at least one action 39 located at the matrix cell 36 associated with the index and can perform at least one action 39. Cell/action selector 23 can maintain, for example, any dynamic variables associated with any at least one action 39 that might be taken as a result of button press 37A (FIG. 1) in dynamic data store 42. One result of at least one action 39 can be the invocation of navigation screen selector 25 which can select navigation screen 31, that is determined by at least one action 39, to present on display 27, and can maintain a trail of navigation screens 31 in dynamic data store 42. As a result of visual instructions 27A (FIG. 1) on navigation screen 31, the user may depress another at least one button 37 on remote control 12 and begin the process again.

Continuing to refer to FIG. 4, navigation screen network constructor 13 can create navigation screens 31 and relations among them in order to create navigation screen network 33. Initializer 19 can select an initial navigation screen 31 that can be provided to the user after power-on. Initializer 19 can, depending on the current location in navigation screen network 33, display screens without button press 37A (FIG. 1), such as when providing a tutorial about the functionality of remote control 12. CPU 11 can be, for example, stand-alone, or can be connected to communications network 16. Executable code to implement navigation screen system 10 can be provided by, for example, computer readable media 16A or communications network 16.

Continuing to still further refer to FIG. 4, in general, navigation screen system 10 can provide, but is not limited to, the following options for at least one action 39:

Language selection;

Device setup and power interruption management during setup, button definitions such as never run, resume, run later, and call number for questions or repairs;

A choice between disk, tape, and television inputs;

Automatic detection of antennae/cable, received channels, if the source of the input signal is cable;

A redisplay of display 27 every time a connected device is powered on;

Default state set to play mode;

Automatic detection of media type (disc/tape) and mode (play, stop, etc.);

Button definitions such as reverse, reverse scan, play/pause, forward, forward scan, stop, dad's favorites, mom's favorites, kid's favorites, channel +/−, favorite channels 1, last channel, favorite channels 2, previous slide, play slide show, next slide, watch, record, copy, and setup;

Display advanced options on display 27 beside a picture of remote control 12, and allowing selection with cursor buttons 43;

Advanced options such as commercial skip, audio, slow motion, index search, zero return, counter reset, auto tracking, disc menu, display, search, audio, subtitle, angle, zoom, repeat, bookmark, repeat, random, program, rotate image, flip image, slideshow time, and transitions;

Automatic or manual clock (date/time) set;

Recording options such as record now, set timer recording, view timer summary, recording from tape, disk, camcorder/other, recording every day, weekly, one time, or Monday-Friday;

Copy options such as disk to tape, tape to disk, and other;

Viewing options such as disk, television, and tape; and

Setup options such as advanced setup, edit DVD, and customize.

Navigation screen system 10 can also allow for user-defined menus such as, but not limited to, game, disk, tape, cable box, satellite, high definition television, computer, camcorder, receiver, karaoke, favorite channels, restore factory settings, change password, displayed alpha keypad, initialize disk, finalize disk, original, playlist, edit, add chapter marker, change thumbnails, play title, view chapter menu, name title, delete title, and add playlist.

Figure 5:
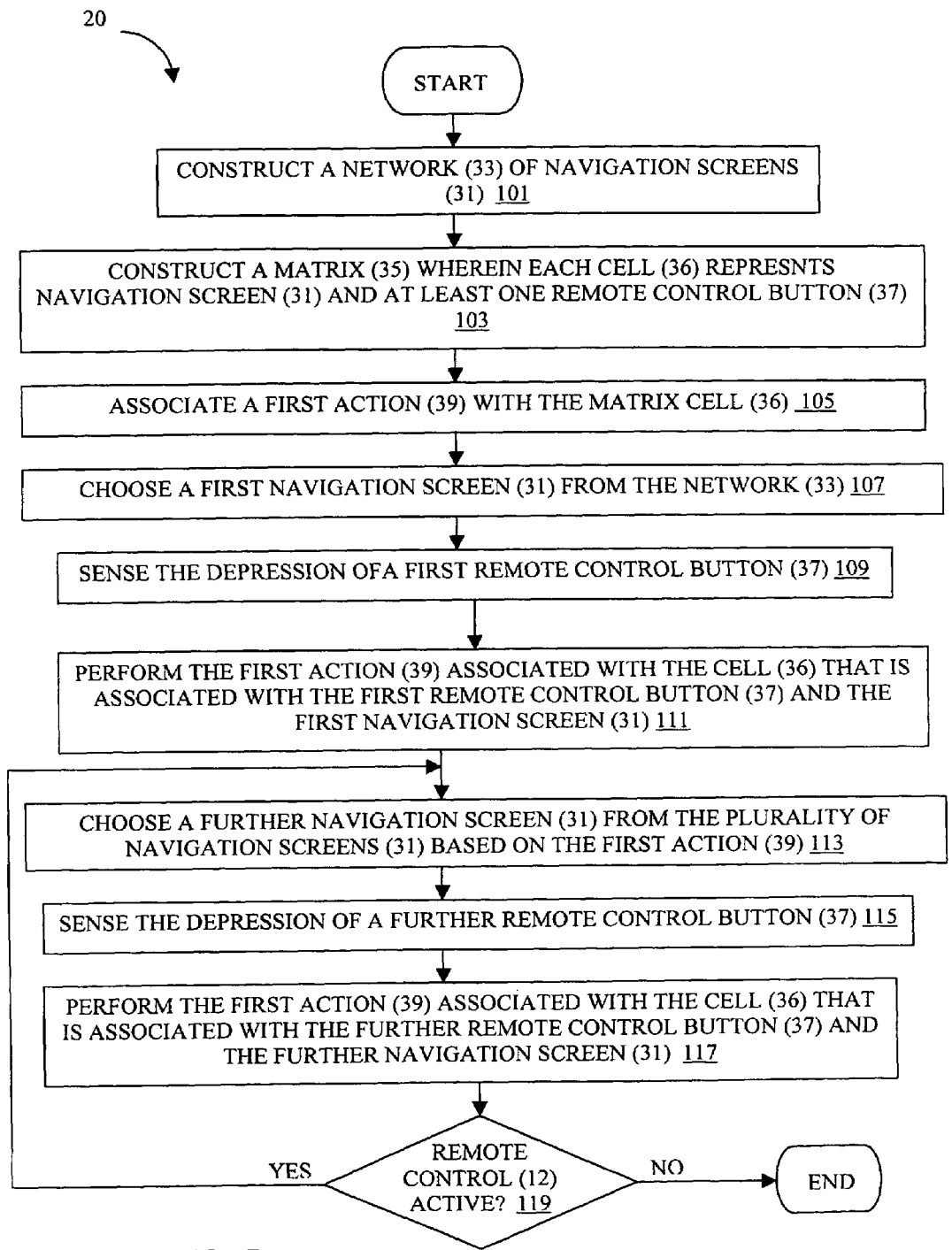
FIG. 5 is a flow diagram of the method of the present invention.

Referring now primarily to FIG. 5, method 20 of the present invention can include, but is not limited to, the steps of constructing a navigation screen network 33 (FIG. 1) of navigation screens 31 (FIG. 1) (method step 101), and constructing matrix 35 (FIG. 3) wherein each matrix cell 36 (FIG. 3) of matrix 35 represents navigation screen 31 from navigation screen network 33 and at least one remote control button 37 from remote control 12 (method step 103). Method 20 can further include the steps of associating a first action 39 with the matrix cell 36 (method step 105), choosing a first navigation screen 31 from navigation screen network 33 (method step 107), and sensing the depression of a first remote control button 37 (method step 109). Method 20 can still further include the steps of performing the first action 39 associated with the matrix cell 36 that is associated with the first remote control button 37 and the first navigation screen 31 (method step 111), and choosing a further navigation screen 31 from the plurality of navigation screens 31 based on the first action 39 (method step 113). Method 20 can still further include the steps of sensing the depression of a further remote control button 37 (method step 115), and performing the first action 39 associated with the matrix cell 36 that is associated with the further remote control button 37 and the further navigation screen 31 (method step 117). While remote control 12 is active (decision step 119), method 20 continues execution with method step 113. Method 20 can be, in whole or in part, implemented electronically. Signals representing actions taken by elements of navigation screen system 10 (FIG. 4) can travel over at least one communications network 16 (FIG. 4). Navigation screen system 10 can be implemented to execute on at least one computer node in at least one communications network 16. Control and data information can be electronically executed and stored on at least one computer-readable medium 16A (FIG. 4). Common forms of at least one computer-readable medium 16A can include, for example, but not limited to, a floppy disk, a flexible disk, a hard disk, magnetic tape, or any other magnetic medium, a Compact Disk Read Only Memory (CDROM) or any other optical medium, punched cards, paper tape, or any other physical medium with patterns of holes, a Random Access Memory (RAM), a Programmable Read Only Memory (PROM), and Editable PROM (EPROM), a FLASH-EPROM, or any other memory chip or cartridge, a carrier wave, or any other medium from which a computer can read.

Referring now primarily to FIG. 6, remote control 12 of the present invention can include, but is not limited to, dynamically definable buttons 41, cursor buttons 43, and enter button 45, collectively referred to as at least one button 37 (FIG. 4). Remote control 12 can further include power button 47, go button 49, options button 51, and DVD-VCR switch 53, also collectively referred to as at least one button 37 (FIG. 4). While remote control 12 is active, navigation screen selector 25 (FIG. 4) presents on display 27 (FIG. 4) an image of remote control 12 having definitions corresponding to the current context for each at least one button 37. As the user depresses at least one button 37, display 27 provides appropriate definitions based on matrix 35 (FIG. 3) that is associated with, for example, remote control 12, navigation screen network 33 (FIG. 4), and device connections 18 (FIG. 4).

Figure 7:
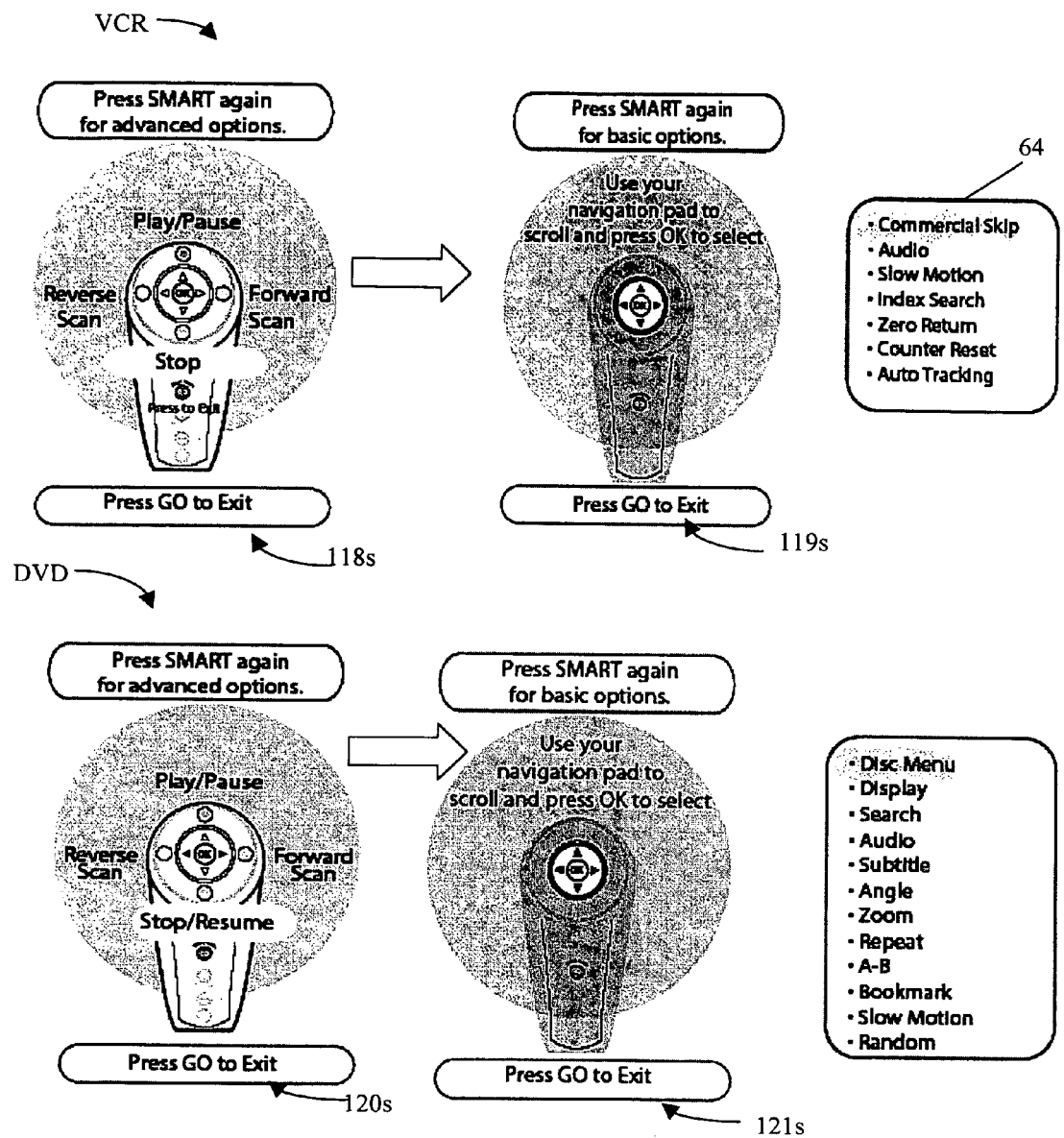
FIGS. 7-9 are pictorial diagrams of exemplary navigation screens that could form the smart setup of the present invention.
Figure 8:
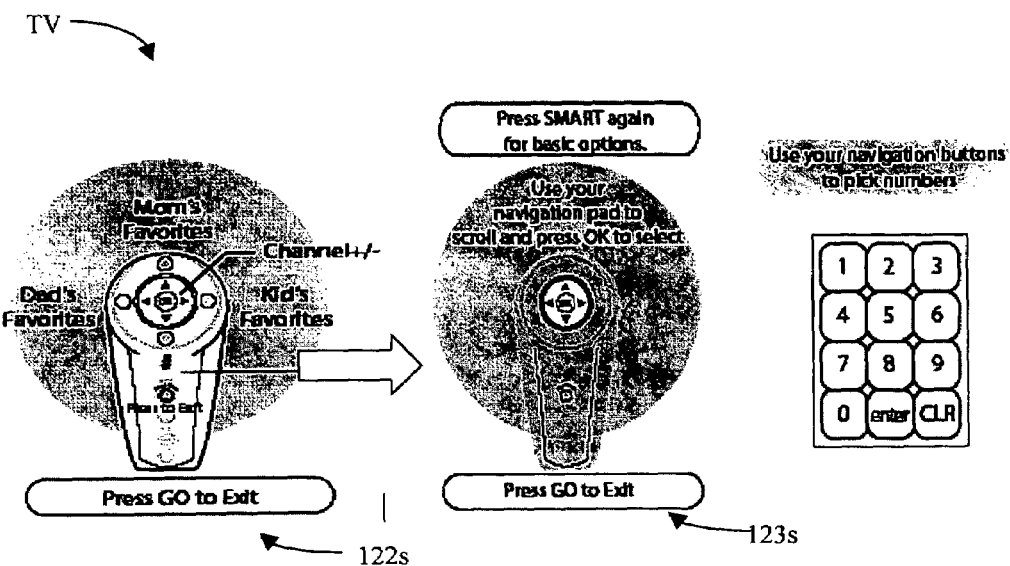
Figure 8:
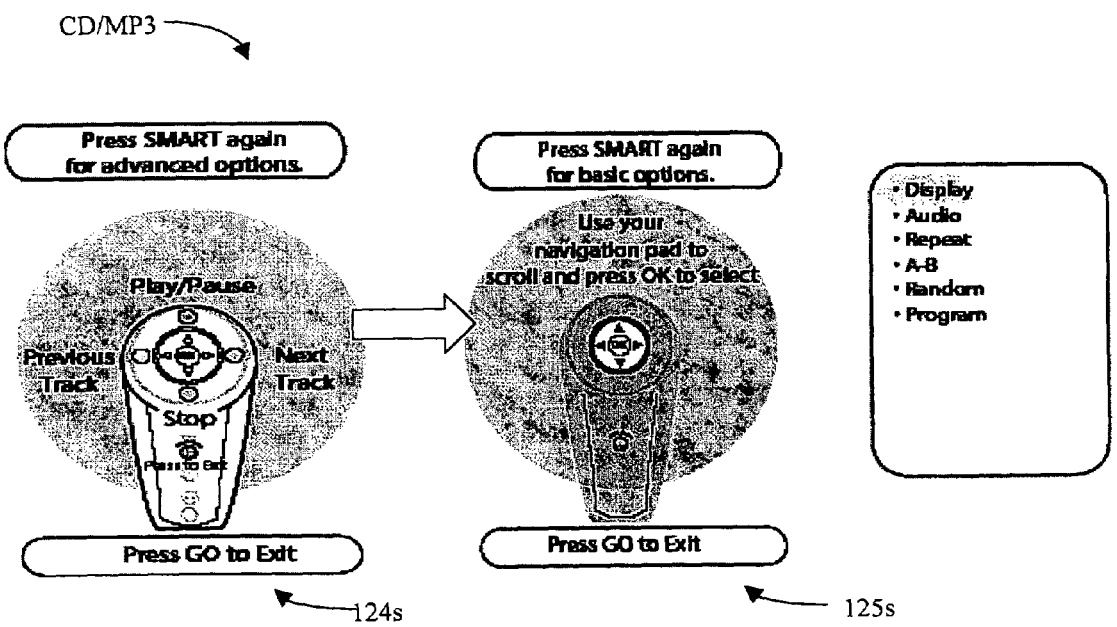
Figure 9:
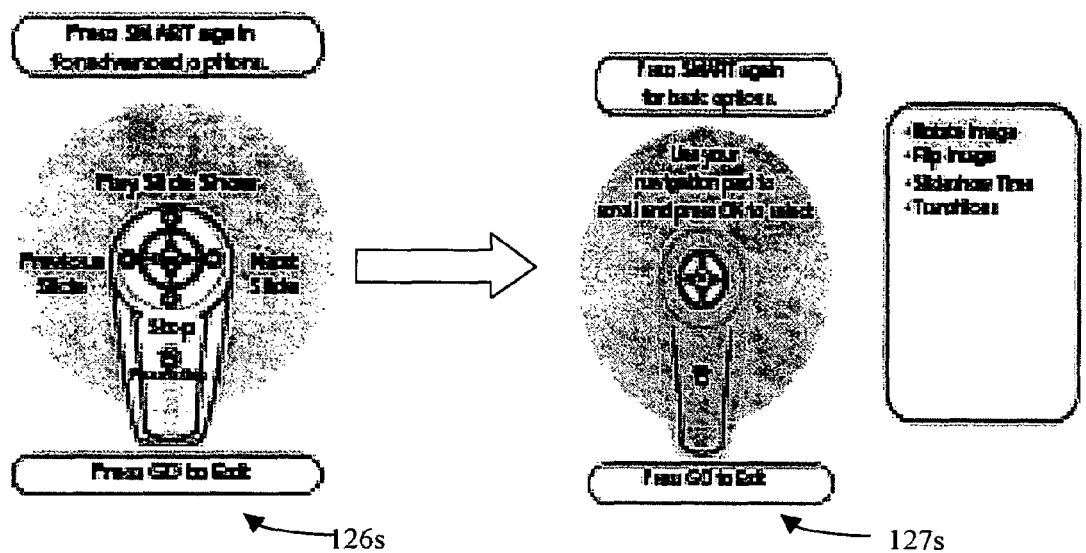
Figure 10:
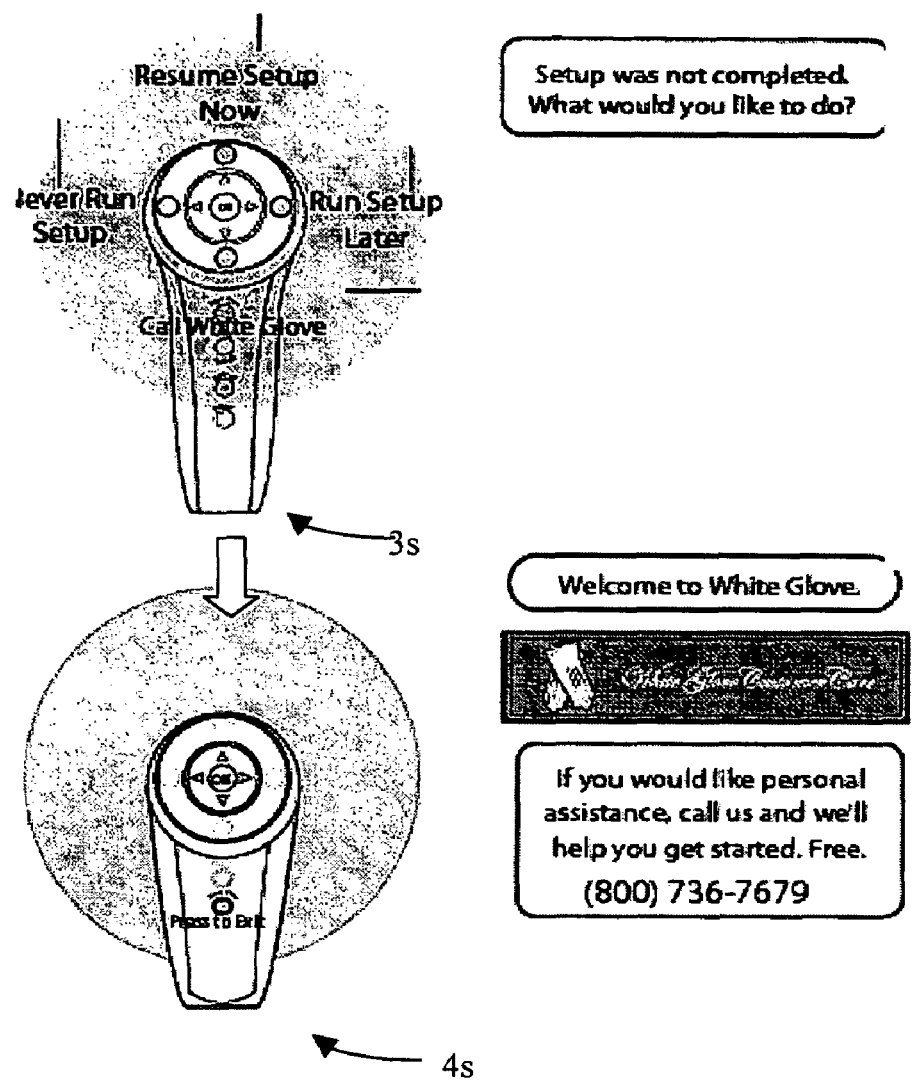

Referring now primarily to FIGS. 7-9, exemplary smart setup 61 (FIGS. 1B and 2) screens 118$s$-127$s$ are shown. Navigation screen system 10 (FIG. 4) can automatically determine device connections 18 (FIG. 4) such as, for example, VCR, DVD, TC, CD/MP3, and Picture CD. When, for example, a VCR is part of the system navigation screen 118$s$ (FIG. 7), and possibly navigation screen 119$s$ (FIG. 7), can be presented to the user. Likewise, if a DVD is part of the system, navigation screen 120$s$ (FIG. 7), and possibly navigation screen 121$s$ (FIG. 7), can be presented to the user. For TV, navigation screens 122$s$ (FIG. 8) and 123$s$ (FIG. 8) can be presented, for CD/MP3, navigation screens 124$s$ (FIG. 8) and 125$s$ (FIG. 8) can be presented, for Picture CD, navigation screens 126$s$ (FIG. 8) and 127$s$ (FIG. 8) can be presented. As shown, button definitions and directions for the user can change depending on which device is being controlled. If the "smart" button were numbered "5", for example, matrix 35 (FIG. 3) could have, at cell $a_{118,5}$, a pointer to navigation screen 119$s$ along with, for example, a dynamically variable choice list 64. Likewise, at cell $a_{118,5}$, matrix 35 could have another matrix $b_{m,n}$, which could contain properties of navigation screen 119$s$, including, for example, color, title, and other features.

Referring now primarily to FIGS. 10-12A, screens to, for example, transition from smart setup 61 (FIGS. 1B and 2) to system initialization 63 (FIGS. 1B and 2) are shown, for example screens 3$s$ and 4$s$ (FIG. 10), and to begin system initialization 63, screen 1s (FIG. 11). As shown, when the user depresses the power button, further instructions appear to direct the user through language selection. When smart setup 61 and system initialization 63 are complete, screens such as, for example, screens 22$s$ and 24$s$ (FIG. 12A) can be provided to the user.

Referring now primarily to FIGS. 12B-13, screens to, for example, implement button push processing 65 (FIGS. 1B and 2) are shown. At transition point A (FIG. 12A), button push processing 65 prompts the user to record, copy, watch, or setup in screen 25$s$ (FIG. 12B), and when recording, to select an option, for example, in screen 26$s$ (FIG. 12B). Exemplary screens for copy, watch, and setup are shown in screens 50$s$, 72$s$, and 79$s$ (FIG. 13) respectively.

The compact disc which forms part of this specification contains a single file as follows:

| Name | Creation Date | File Size |
|---|---|---|
| gv_120904_flowchart V9all.pdf | Dec. 16, 2004 | 13.2 MB |

Although the invention has been described with respect to various embodiments and methods, it should be realized that this invention is also capable of a wide variety of further and other embodiments.

What is claimed is:

1. A method for presenting a plurality of navigation screens to a user of a remote control comprising the steps of:
   (a) constructing a network including a plurality of navigation screens;
   (b) constructing a matrix of cells that associates the plurality of navigation screens with a plurality of buttons from the remote control;
   (c) associating a first action with each cell of the matrix;
   (d) choosing a first navigation screen from the plurality of navigation screens from the network;
   (e) sensing the depression of a first button;
   (f) performing the first action associated with the cell that is associated with the first button and the first navigation screen;
   (g) choosing a further navigation screen from the plurality of navigation screens from the network based on the first action;
   (h) sensing the depression of a further button;
   (i) performing the first action associated with the cell that is associated with the further button and the further navigation screen;
   (j) repeating steps (g)-(i) while the remote control presents the navigation screen to the user of the remote control which is used to control a display;
   creating the matrix in two dimensions having matrix rows represent screen numbers from the network and having matrix columns represent the plurality of buttons; and
   generating indices into the matrix.

2. The method as in claim 1 further comprising the steps of:
   determining device data associated with devices that are controlled by the remote control;
   storing the device data in dynamic data store; and
   modifying the network according to the device data.

3. The method as in claim 1 further comprising the step of:
   associating each cell with an action.

4. The method as in claim 1 further comprising the step of:
   populating the each cell with a pointer to a sub-matrix.

5. The method as in claim 1 further comprising the step of:
   populating the each cell with a navigation screen number pointer.

6. The method as in claim 1 further comprising the step of:
   providing visual instructions on display about using the remote control while the user is navigating the navigation screen.

7. The method as in claim 1 further comprising the step of:
   providing for user-defined menus.

8. A system for presenting a plurality of navigation screens to a user of a remote control comprising:
   a matrix constructor for constructing a matrix having a plurality of cells that relate a plurality of buttons with a navigation screen, said navigation screen being part of a network, said matrix having two dimensions representing the plurality of buttons in one said dimension and screen numbers from the network in another said dimension;
   an action associator for associating a cell with an action;
   a button sensor for receiving a depression signal for said button from the remote control;
   a cell/action selector for choosing said cell that is associated with said button and said navigation screen, said cell/action selector performing said action associated with said cell; and
   a navigation screen selector for selecting and presenting a navigation screen based on said action.

9. The system as in claim 8 further comprising:
   a node in a communications network executing computer instructions to implement said matrix constructor, said action associator, said button, said cell/action selector, and said navigation screen selector.

10. The system as in claim 8 further comprising:
    a communications network; and
    at least one node in said communications network executing computer instructions to implement said matrix constructor, said action associator, said button, said cell/action selector, and said navigation screen selector.

11. The system as defined in claim 8 further comprising:
    an initializer for selecting at least one navigation screen from said network.

12. The system as defined in claim 8 further comprising:
    a network constructor for building said network that includes said navigation screen.

13. A method for presenting a plurality of navigation screens to a user of a remote control comprising the steps of:
    providing a remote control that interfaces to controlled devices through device connections;
    receiving a button depression from buttons at the remote control;
    accessing a network of navigation screens having navigation screen numbers associated with the button depression;
    generating indices into a matrix in two dimensions representing the navigation screen numbers in one of the dimensions and representing the buttons in the other of the dimensions; and
    accessing cells of the matrix from the indices for direction for subsequent action, including presenting navigation screens.

14. The method as in claim 13 further comprising the step of:
    updating the matrix and the network as a result of changes to the device connections.

15. The method as in claim 13 further comprising the step of:
    providing visual instructions about the usage of the remote control.

16. The method as in claim 13 further comprising the step of:
    maintaining dynamic data that could change as a result of changes to the device connections.

17. In a system for presenting a plurality of navigation screens to a user, said system including a remote control, the improvement comprising:
    (a) a network including a plurality of navigation screens;
    (b) a matrix of cells associating the plurality of navigation screens with a plurality of buttons from the remote control;
    (c) an action associator associating a first action with each cell of the matrix;
    (d) an initializer on the remote control providing a first navigation screen from the plurality of navigation screens from the network;

(e) a button sensor sensing the depression of a first button by a user;

(f) a cell action selector performing a first action associated with the cell that is associated with the first button and the first navigation screen;

(g) said button sensor permitting the user to choose a further navigation screen from the plurality of navigation screens from the network based on the first action;

(h) said button sensor sensing the depression of a further button;

(i) said cell action selector performing another action associated with another cell that is associated with the further button and the further navigation screen; and (j) whereby items (g)-(i) may be accessed repeatedly using the remote control to present the further navigation screen to the user of the remote control which is used to control a display; and a navigation screen network constructor creating said matrix in two dimensions having matrix rows and matrix columns, said matrix rows and said matrix columns representing screen numbers from the network and the plurality of buttons, said navigation screen network constructor generating indices into said matrix.

\* \* \* \* \*